March 23, 1937.  L. N. SMITH  2,074,708
MOTOR DRIVEN MIXER
Original Filed Feb. 27, 1934   3 Sheets-Sheet 2
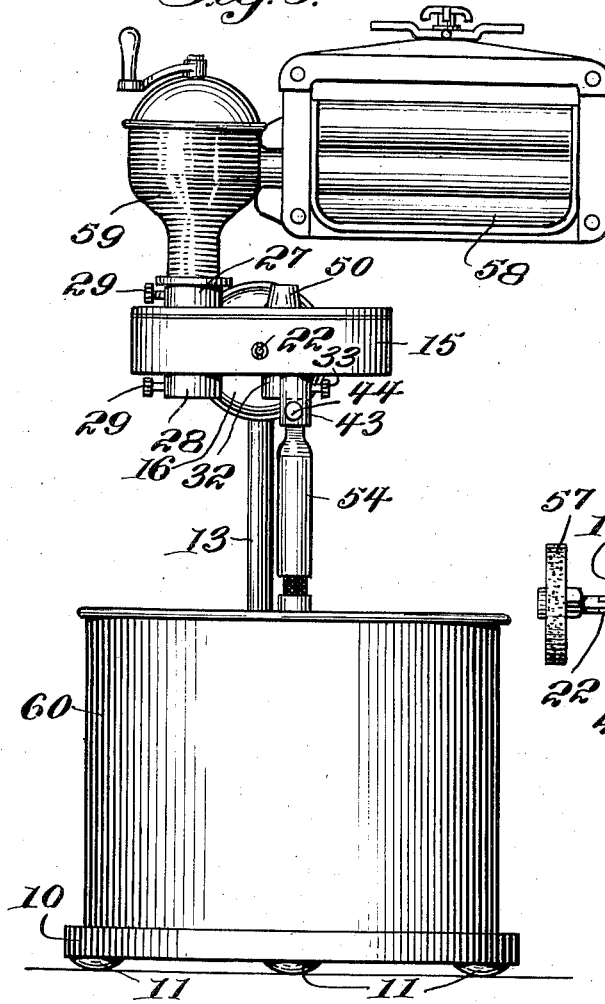
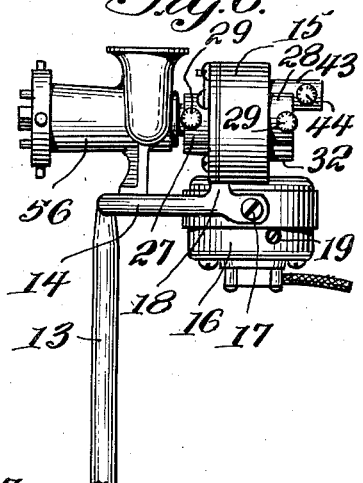
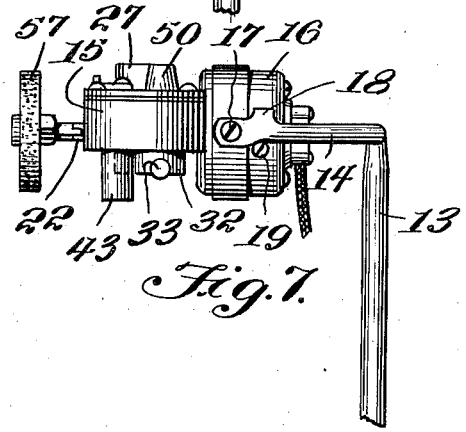
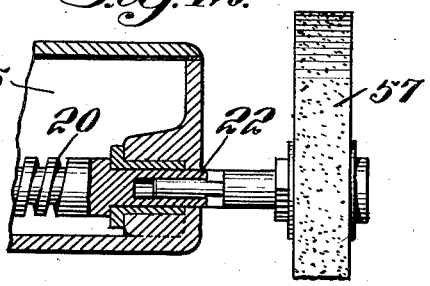
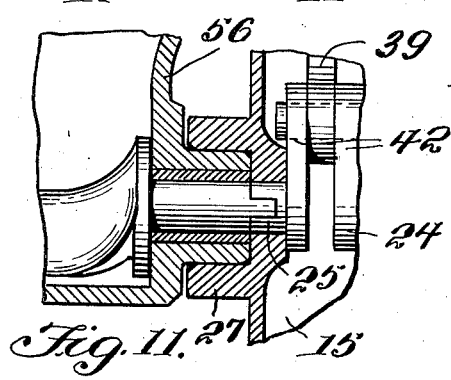
Lucius N. Smith
INVENTOR
BY Victor J. Evans & Co.
ATTORNEY March 23, 1937. L. N. SMITH 2,074,708
MOTOR DRIVEN MIXER
Original Filed Feb. 27, 1934 3 Sheets-Sheet 3
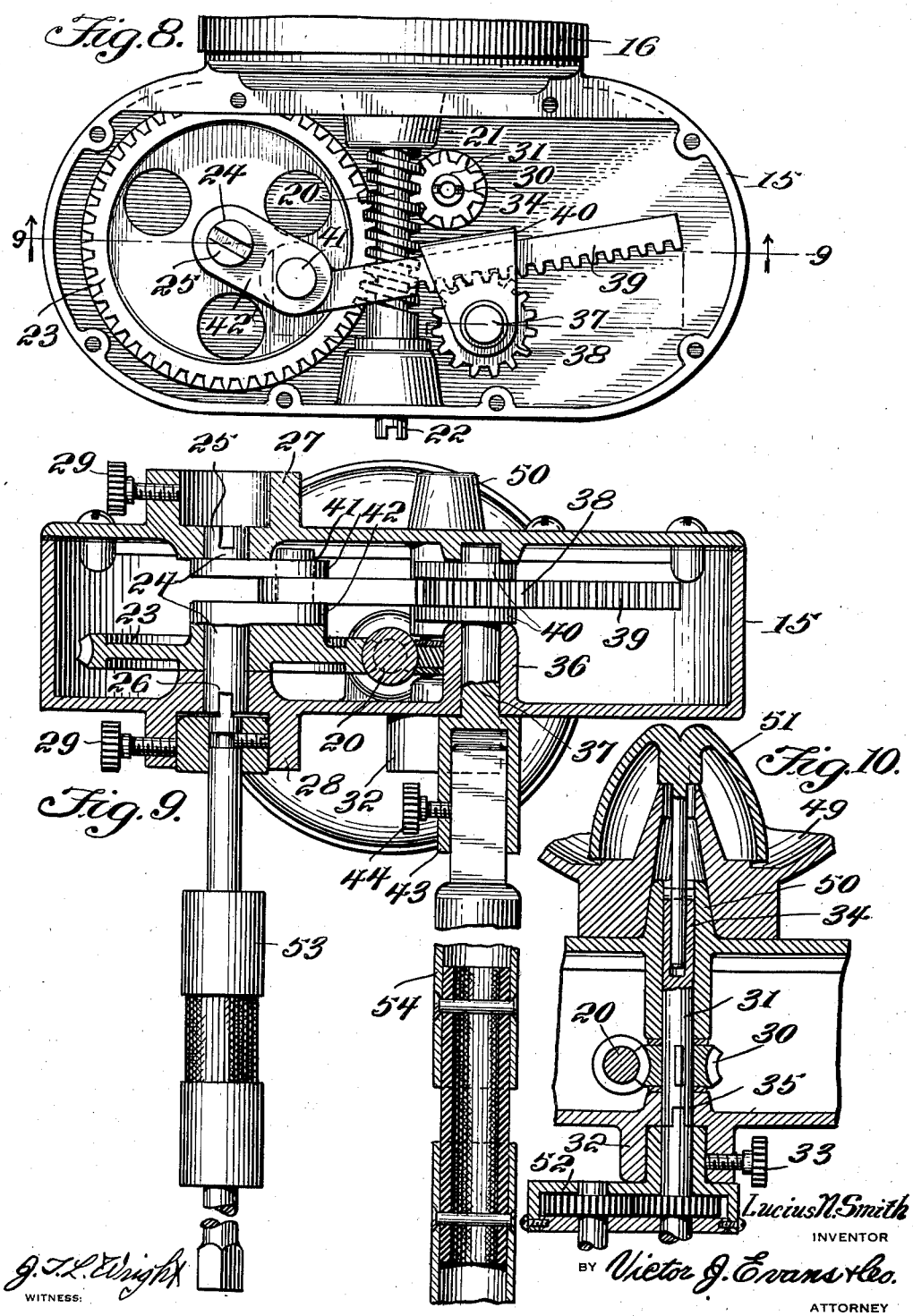
Lucius N. Smith
INVENTOR
BY Victor J. Evans & Co.
ATTORNEY Patented Mar. 23, 1937

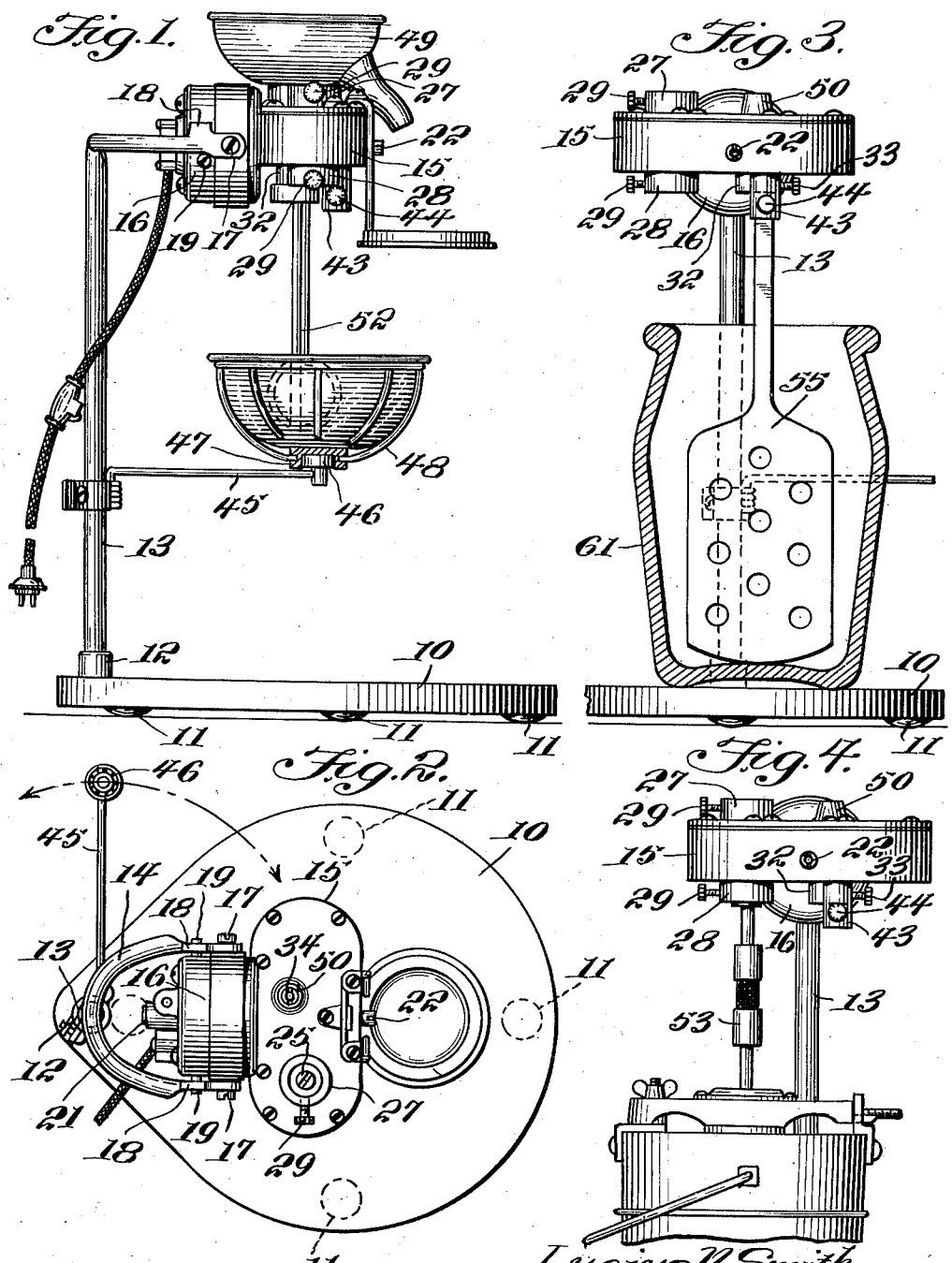

2,074,708

UNITED STATES PATENT OFFICE 2,074,708

MOTOR DRIVEN MIXER

Lucius Neal Smith, Atlanta, Ga., assignor of one-half to C. R. Medley, Columbus, Ga.

Application February 27, 1934, Serial No. 713,223
Renewed September 28, 1935

2 Claims. (Cl. 74—75)

The invention relates to a motor driven mixer and more especially to an electrically operated general utility machine.

The primary object of the invention is the provision of a machine of this character wherein, through the instrumentality of variably driven connections with a source of power, different kinds of appliances can be actuated, as for example, a churn, juice extractor, beater, mixer, grinder and numerous other implements, thus affording a handy machine for kitchen, household or other needs.

Another object of the invention is the provision of a machine of this character, wherein the same is readily portable and can be converted for a variety of uses and for power transmission at varying speeds.

A further object of the invention is the provision of a machine of this character, wherein the driving mechanism is of novel construction and mounted in a novel manner to allow for the use of appliances of variable or different kinds and thus affords a labor saver in the operation of such appliances.

A still further object of the invention is the provision of a machine of this character which is comparatively simple in its construction, thoroughly reliable and efficient in its operation, enabling the convenient and easy attachment of different appliances for the use thereof, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a side elevation of the machine showing the same constructed in accordance with the invention and having a juice extractor and bowl rack associated therewith.

Figure 2 is a top plan view with the juice extractor removed and the bracket for the bowl rack swung away from the base.

Figure 3 is a fragmentary front elevation showing the use of the machine as a churn.

Figure 4 is a view similar to Figure 3 showing the machine used as an ice cream freezer driver.

Figure 5 is an elevation showing the application of a wringer and washing machine therewith.

Figure 6 is a fragmentary elevation showing the use of the machine for driving a meat grinder.

Figure 7 is a side elevation showing the machine for use as a tool grinder.

Figure 8 is an enlarged top plan view showing the top of the gear casing removed.

Figure 9 is a sectional view on the line 9—9 of Figure 8.

Figure 10 is a fragmentary sectional view showing the drive connection between the fruit extractor and a mixer.

Figure 11 is a fragmentary sectional view showing in detail the connection between the meat grinder and the drive mechanism of the machine.

Figure 12 is a detail sectional view showing the connection between the tool grinder and the drive of the machine.

Similar reference characters indicate corresponding parts throughout the several views in the drawings.

Referring to the drawings in detail, the machine comprises a base 10, in this instance, of circular contour, yet it may be of any other desirable shape and is provided at its underside with suitable feet 11 so that the base will be slightly elevated from a floor or foundation or other support carrying the same. Carried by the base near the marginal edge thereof is a vertical socket 12 for accommodating an upright or post 13 which may be of any desirable height according to the requirements of use of the machine, and this post, at its upper end, is formed with a horizontally directed fork or yoke 14 for accommodating and supporting a swingingly mounted gear casing or housing 15 joined with an electric motor 16, either for direct current or alternating current, and the same being adapted for separable connection with any suitable source of current supply. The motor 16 has the trunnions 17 journaled in the arms of the yoke or fork 14, so that the casing or housing may be swung in a vertical direction and is limited in its swinging movement through the medium of stops 18 and 19, respectively, the stops 18 being formed on the yoke or fork 14, while the stop 19 is on the motor. Arranged within the casing or housing 15 is a worm screw shaft 20 which is an extension or coupled with the driving shaft 21 of the motor and the outer end of said shaft 20 is extended through the casing or housing 15 and is provided exteriorly thereof with a coupling terminal 22 for the attachment of an appliance to be operated at high speed.

At one side of the shaft 20 and within the casing or housing 15 is a large gear 23 meshing with said worm screw shaft, its arbor 24 being extended through opposite sides of the casing or housing 15 and having the coupling terminals 25 and 26, respectively, which are centered with respect to the sockets 27 and 28, respectively, formed with the sides of said casing or housing, each socket being fitted with a set screw 29 for the detachable mounting of an appliance therein, while either coupling terminal 25 or 26 is adapted for connection with the driving medium of such appliance for slow speed operation thereof.

At the other side of the shaft 20 and within the casing or housing 15 is a small gear 30 meshing with said worm screw shaft, its arbor 31 being extended through opposite sides of the casing or housing and centered at one side with respect to a socket 32 carrying a set screw 33, the opposite ends of the arbor 31 being formed with coupling terminals 34 and 35, respectively, for the connection of the driving mediums of appliances to be operated at a greater speed than the speed of the gear 23.

Formed interiorly of the casing or housing 15 at the same side with respect to the gear 30 is a bearing 36 fitted with a stud shaft 37 carrying a rack gear 38 engaging a rack bar 39, the latter being held in mesh with the gear 38 through the medium of a swinging guide 40 loose upon the stud shaft 37 and this rack bar 39 is pivotally connected, at 41, to a crank formation 42 built with the arbor 24 of the gear 23, so that the rack bar will be reciprocated and oscillated under the rotary movement of the gear 23 and thus oscillating the stud shaft 37 which, through the medium of a socketed sleeve-like coupling 43, can have attached thereto an appliance to be driven by oscillatory action, the coupling 43 being fitted with a set screw 44 for the attachment of the appliance therewith.

Adjustably carried upon the post 13 is a bracket 45 susceptible of horizontal swinging movement and at the free end of the same is a ball bearing equipped rotatable head 46 constituting a male fitting for a female coupling 47 therewith of a bowl rack 48 which, when containing the bowl having contents, is free for rotation so as to assure a thorough mixing of the contents of the bowl when a mixer appliance is operating within the bowl and driven by the machine.

In Figure 1 of the drawings the casing or housing 15 has carried thereby at its top a fruit juice extractor including the bowl 49 which fits over the boss 50 about the arbor 31 and this arbor, through the coupling terminal 34, has connection with the juice extractor cone 51 working within the bowl 49 of said extractor. At the lower side of the casing or housing 15 is a mixer appliance 52, it being fastened in the socket 32 and having connection with the arbor 31 to be driven thereby.

Adapted to be engaged in the socket 28 is a flexible connection 53 for driving an ice cream freezer or other appliance.

Adapted for connection with the sleeve-like coupling 43 is the driven flexible shaft 54 or the churn paddle 55, while engageable with the coupling terminal 25 is the driven part of a meat grinder 56, the same being detachably secured in the socket 27.

Engageable with the terminal 22 of the shaft 20 is a tool grinding disk or wheel 57. Thus it will be seen that the machine is susceptible of operating many different kinds of appliances, particularly those that have to do with houshold or kitchen purposes or for farm activities, as for example, churning, and for the operation of a clothes wringer, washing machine or other contrivance.

In the use of the machine as a churn, of course, it is understood that the bracket is either removed or shifted out of the way of the churn body when placed upon the base 10, the bracket being serviceable for the operation of the machine as a mixer.

In Figure 5 of the drawings there is shown a clothes wringer 58 which has its mounting 59 engaged in the socket 27, and resting upon the base 10 is a washing machine body 60, while in Figure 3 the churn body 61 rests upon said base.

What is claimed is:

1. A machine of the character described comprising a housing supported for vertical swinging movement, a feed screw shaft journaled in said housing and having a coupling end exposed exteriorly of the housing, a motor mounted with the housing and having driving connection with said feed screw shaft, rotatable couplings exposed exteriorly of the housing at opposite sides thereof and arranged at opposite sides of the screw shaft, driven connections between the screw shaft and certain of said last-named couplings, a rack bar, a gear engaging the screw shaft, a crank operated by the gear and having connection with the rack bar, and a rack gear operating another of said last-named couplings and engaged with said rack bar for alternate rotation of said coupling.

2. A machine of the character described comprising a housing supported for vertical swinging movement, a feed screw shaft journaled in said housing and having a coupling end exposed exteriorly of the housing, a motor mounted with the housing and having driving connection with said feed screw shaft, rotatable couplings exposed exteriorly of the housing at opposite sides thereof and arranged at opposite sides of the screw shaft, driven connections between the screw shaft and certain of said last-named couplings, a rack bar, a gear engaging the screw shaft, a crank operated by the gear and having connection with the rack bar, a rack gear operating another of said last-named couplings and engaged with said rack bar for alternate rotation of said coupling, and article attaching socketed extensions formed with said housing and common to certain of said couplings.

LUCIUS NEAL SMITH.